United States Patent [19]
Smyczek

[11] Patent Number: 5,146,734
[45] Date of Patent: Sep. 15, 1992

[54] UNDERWATER VEGETATION CUTTER

[76] Inventor: Paul, J. Smyczek, 9937 W. Edgerton Ave., Hales Corners, Wis. 53130

[21] Appl. No.: 670,570

[22] Filed: Mar. 18, 1991

[51] Int. Cl.$^5$ ............................................. A01D 1/06
[52] U.S. Cl. ........................................ 56/8; 56/239; 56/289; 30/309
[58] Field of Search ............... 56/8, 9, 229, 239, 255, 56/289, 295; 30/309, 317, 356

[56] References Cited

U.S. PATENT DOCUMENTS

| | | | |
|---|---|---|---|
| 1,772 | 9/1840 | Hinds | 56/8 |
| 2,610,459 | 9/1952 | MacKenzie | 56/8 |
| 2,864,225 | 12/1958 | Williams | 56/8 |
| 2,961,817 | 11/1960 | Mitchell | 56/8 |
| 3,601,956 | 8/1971 | Akermanis | 56/8 |

FOREIGN PATENT DOCUMENTS 1327501 4/1963 France .................... 30/309

*Primary Examiner*—Terry Lee Melius
*Attorney, Agent, or Firm*—Fuller, Ryan, Hohenfeldt & Kees

[57] ABSTRACT

An underwater weed cutter comprises a generally W-shaped object which is cut out of a plate or sheet of metal and is configured similar to two scythes whose opposite ends are joined together to form a unitary object which has a line attached to it to provide for pulling it along the bottom of a body of water to shear off and collect underwater weeds. The weed cutters are configured such that the outside or convex boundary of one of them is complementary in shape to the inside or concave boundary of another of them so that there is no metal waste developed between the cutters when they are being cut from the plate.

5 Claims, 2 Drawing Sheets

UNDERWATER VEGETATION CUTTER

BACKGROUND OF THE INVENTION

The invention disclosed herein relates to a device for cutting underwater vegetation such as weeds by being dragged along the bottom of a body of water using a line pulled by a human being. The cutting device could be used on dry land but it is intended for cutting weeds near the shore of a pond, river or lake.

A perennial problem of property owners along a lake or river shore is removal of weeds which grow on the bottom of the body of water. In some communities which are proximate to rivers or lakes, property owners make contributions to purchasing, maintaining and operating power driven weed cutters. In most cases, however, it is up to the property owner to rid the water adjacent the shore of weeds which are unsightly and, even more importantly, present a hazard to boating, fishing and swimming near the shore. A variety of weed cutters have been devised for being dragged underwater by means of a rope which is attached to a moving boat or which is pulled by a person standing on the shore. One example is shown in U.S. Pat. No. 1,772, dated Sep. 5, 1840. This patent shows what is called a scythe comprised of two elongated blades which have corresponding ends bolted together to form a V-shaped configuration. A rigid handle or line is attached to the apex of the V and the device is made of metal heavy enough to sink it to the bottom of the body of water so it will supposedly cut weeds as it is dragged along. The leading edges of the blades are sharpened for enhancing the cutting action.

Another type of underwater weed cutter is disclosed in U.S. Pat. No. 2,961,817, dated Nov. 29, 1960. The cutter in this patent comprises a relatively thin flat semicircular piece of metal whose inside or concave edge is sharpened. A plurality of tines extend through the flat piece of metal from above and below its top and bottom surfaces. There are eye-bolts at opposite ends of the semi-circular cutter to provide for attaching lines which facilitate dragging the device along the lake or river bed to shear the weeds.

Another type of underwater weed cutter is described in U.S. Pat. No. 2,864,225, dated Dec. 16, 1958. It comprises a triangularly shaped body having a hole in one of the apices of the triangle for engaging the body with a line. Two blade structures constituting long arms carrying corrugated devices serve as saws. A member similar to a keel on the bottom side of the triangular body stabilizes the body as it is dragged along the lake bed.

Among the problems associated with the known weed cutters described above is their cost resulting from the multiplicity of parts of which they are composed and from the several required manufacturing or assembly operations such as molding of parts, cutting and installing tines which bring about a raking action, drilling holes and grinding cutting edges.

SUMMARY OF THE INVENTION

The underwater weed cutter disclosed herein is distinguished by its simplicity, low cost, ease of use and effectiveness. Materials are used efficiently in its manufacture. Its structural simplicity is commensurate with its effectiveness.

Briefly stated, the new weed cutter is a single flat bar of metal configured with two curved cutting blades, somewhat like wings, which are symmetrical about a nose to which a line is attached for drawing the unitary cutters along a lake or river bed to shear off the weeds. Experience has shown that the concave edges of the blades which encounter the weeds shear off the weeds effectively without being sharpened. The blade portions are configured somewhat similarly to two scythes which are joined together at their corresponding ends to form a unitary cutter whose configuration is suggestive of the letter "W".

The weed cutters are cut out of flat metal sheet stock, preferably with a laser which is guided to follow a path conforming to the contours of the weed cutter by following a stationary pattern which is located at an arms length away from the contour which the torch defines. An oxy-acetylene torch could also be used to cut the weed cutters from a metal plate.

The weed cutters are cut out of steel plate whose width and thickness are standardized. To minimize waste of material, the weed cutters are made in at least two sizes which have complementary shapes so that the convex edge of one nests in the concave edge of the other which means that a single pass of the laser cutting beam or torch forms these concave and convex edges simultaneously so there is no waste of material between them.

A more detailed description of how the new weed cutter is made and used will now be set forth in reference to the drawing.

DESCRIPTION OF A PREFERRED EMBODIMENT

Figure 1:
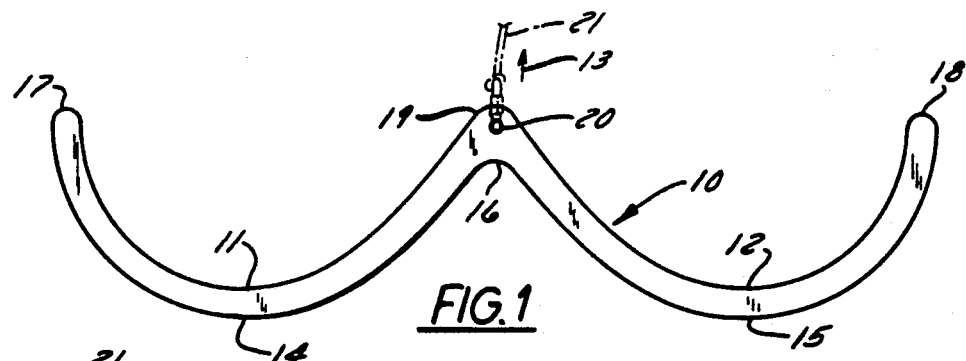
FIG. 1 is a plan view showing in solid lines the configuration of one embodiment or model of the new weed cutter.

Attention is invited to FIG. 1 which shows a plan view of one configuration of the weed cutter in solid lines. As previously mentioned the cutter is preferably cut out of a metal plate along with other weed cutters as in FIG. 6 using a laser beam, not shown, although it could be stamped or otherwise cut from a plate by other metal working methods. An actual embodiment of the unitary weed cutter is cut from ten gauge flat stock which is roughly about one-eighth of an inch thick by way of example and not limitation. The concave edges 11 and 12 in FIG. 1 are the leading edges and serve as the cutting edges of the weed cutter. The cutter 10 can also be characterized as having the general configuration of the letter "W" comprised of concave portions 11 and 12 formed symmetrically on opposite sides of portions which terminate and junction at the apex or nose 19. In use, the cutter is pulled in the direction of the arrow 13. The cutter has two convex or rear edges 14 and 15 which are symmetrical about a point of intersection 16. The tips 17 and 18 of the cutter are rounded. The lateral distance or a straight line between tips 17 and 18 is about forty-eight inches in one actual embodiment of the weed cutter by way of example and not limitation. The nose or apex 19 of the cutter has a hole for attaching a line or rope 21 to the cutter. The models designated by the numeral 10' in FIG. 6, and which have contours that are complementary to the contours of the models 10, are slightly shorter than the models 10 as is evident from inspection.

Figure 2:
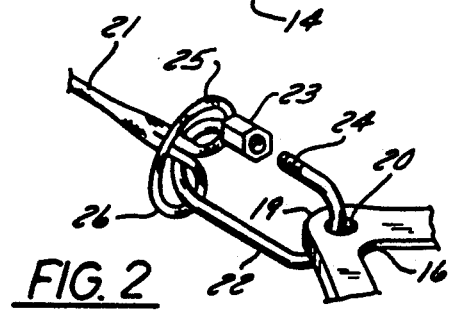
FIG. 2 illustrates one way in which a drag line can be attached to the nose or apex of the weed cutter.
Figure 3:
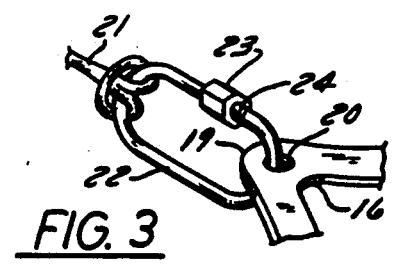
FIG. 3 is similar to FIG. 2 except that in FIG. 3 the step of securing the line to a cutter is completed.

One way of attaching the line 21 to the cutter is depicted in FIGS. 2 and 3. In FIG. 2 a locking ring 22 is being used. Rings of this type are readily available from hardware suppliers. One threaded end of the gap in the ring has an internally threaded hexagon locking nut 23 turned onto it. The other end 24 has an external thread. Before the nut 23 is screwed onto thread 24 the locking ring is passed through hole 20 in the nose 19 of the cutter. In this case, the line 21 is attached to the ring 22. Then, as shown in FIG. 3, the nut 23 is turned onto thread 24 to form a closed ring.

Because of the particular kind of line 21 used, it is attached to the ring 22 before the lock nut 23 is turned onto thread 24. The line used on the marketed products is a braided tubular type of line composed of polypropylene fibers although lines composed of other materials which do not degrade due to wetness could be used. The assembler presses a pointed instrument, not shown, into the side of the braided tubular line at some distance from the end of the line. The end of the line is then pushed into the opening provided after the instrument is withdrawn so that a loop or ring is formed in the line at its end. By gripping the braided line near the base of the loop and stretching it, the end of the line becomes seized in the inside of the tubular line. The loop is then brought back onto the line to form eyes 25 and 26 as illustrated in FIGS. 2 and 3.

Figure 4:
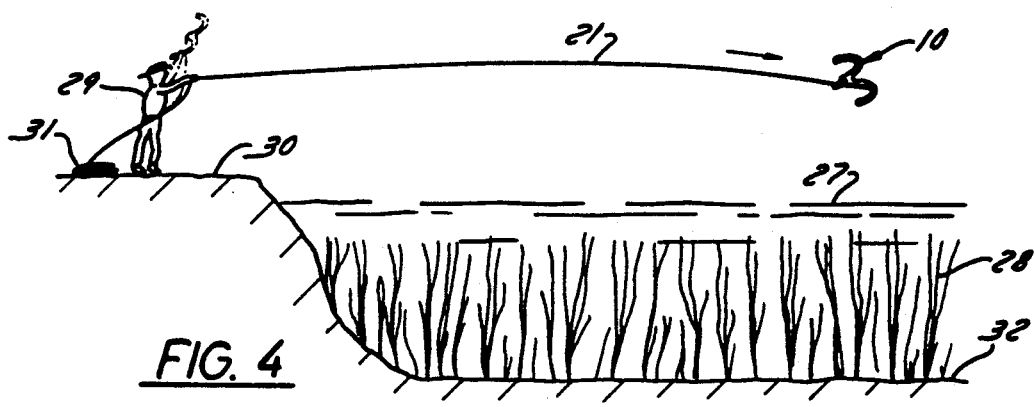
FIG. 4 shows a profile of a body of water on whose bed weeds are growing and shows a person who has tossed the cutter away from the shore in preparation for cutting weeds.
Figure 5:
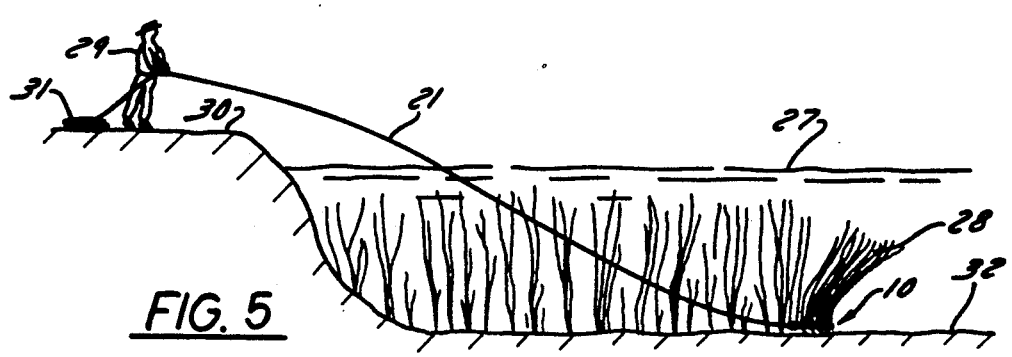
FIG. 5 shows the new weed cutter sunk to the bed of the body of water and being drawn toward the person on shore to effect cutting and gathering of the underwater weeds.

Use of the new weed cutter is demonstrated in reference to FIGS. 4 and 5. As shown in FIG. 4, the weed cutter 10 is thrown or cast manually out into the water in which the weeds are submerged. The person 29 stands on the shore 30 and throws the cutter 10 as far as possible out over the water with the line 21 attached. It is advisable to tie the end of the line in the coil 31 to some stationary object so that accidental throwing of the whole line into the water is precluded. It has been determined that the best way to throw the cutter 10 out over the water is to grip it near one of the ends such as the one adjacent the tip 17 in FIG. 1. A full hand grip is used. The concave and convex edges 11 and 14 of the weed cutter are chamfered so gripping the cutter is comfortable even without a glove on the hand but wearing a glove is recommended. The user then swings the length of the cutter rearwardly as if to execute a forehand stroke with a tennis racket except that the cutter is released ahead of the person's body to let it fly through the air. Because the cutter is flat and thin it sails nicely for a substantial distance. Adult users can easily throw the cutter forty feet from the shore line over the water.

As illustrated in FIG. 5, the cutter 10 sinks to the lake or river bed 32 at which time it is dragged inwardly toward the shore by the person 29 pulling on the line 21. This shears off a cluster of the weeds which are dragged along with the cutter to some extent where they can be removed at the shore line although some fragments of the weeds may float to the top of the water 27 for being scavenged by other means. When the cutter is pulled out of the water the bulk of the weeds which it serves are draped over the cutter and are removably by hand.

Figure 6:
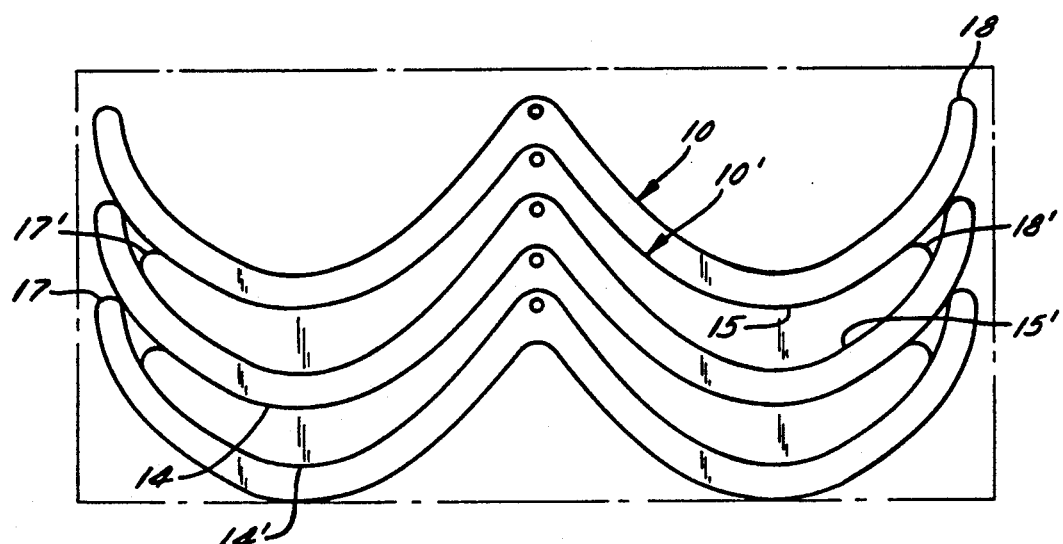
FIG. 6 is a plan view showing how two conceptually similar but slightly differently configured embodiments or models of the new weed cutter can be cut from a single metal plate (shown in phantom lines) such that waste or unused trimmed metal is minimized.

Attention is now invited to FIG. 6 for a discussion of how use of material is economized in accordance with the invention. As previously indicated the weed cutter is cut out of a sheet of flat stock which comes from suppliers in different standardized lengths, widths and thicknesses. It happens that sheets or plates of material are not available which have a width just about equal to the depth, that is, the radial distance from the convex edge 14 to the apex 19 of the weed cutter. Wider sheets are, however, available Waste of metal is minimized by configuring two slightly differently shaped models 10 and 10' so they nest in each other as shown in FIG. 6. When, for example, the laser or torch cuts the convex edges 14 and 15 of a weed cutter 10, the concave edges of the complementarily shaped weed cutter 10' are cut in coincidence so there is no loss of metal other than the kerf due to the cutting beam passing through the metal. Of course, because of the edges of the weed cutters 10 and 10' being non-linear, some waste is unavoidable.

Although a preferred embodiment of the new weed cutter has been described in considerable detail, such description is intended to be illustrative rather than limiting, for the inventive concepts of the weed cutter can be variously implemented and are to be limited only by interpretation of the claims which follow.

I claim:

1. A weed cutter consisting of two planar blade sections, each blade section having a forwardly presented curved concave leading weed engaging edge and each of said blade sections having a rearwardly presented convex edge which is generally concentric to the concave edge of the corresponding blade section, each of said curved blade sections being joined unitarily at a forwardly projecting central region such that said weed cutter is constructed of a single planar piece of metal wherein said blade sections are arranged symmetrically about said central region.

2. The weed cutter according to claim 1 including means for attaching a line to said cutter only at said central region to provide for dragging said cutter through a bed of weeds in a body of water.

3. A weed cutter comprising two flat curved blade sections having corresponding concave edges and corresponding generally concentric convex edges, respectively, said suction having correspond ends integrally joined in end-to-end fashion such that said cutter consist of a single piece of metal having both concave edges presented in the same direction to serve as cutting edges and both convex edges presented in the opposite direction, said sections being arranges symmetrically to where said ends are joined.

4. The weed cutter according to claim 3 including means for attaching a line to said cutter, said means being positioned at the junction of said ends of said blade sections to provide for dragging said cutter through a bed of weeds in a body of water for cutting said weeds.

5. The weed cutter according to claim 3 and a mating wed cutter having substantially the same configuration as the former weed cutter, the convex edges of the blade sections of one of the weed cutters having configurations which are complementary to the configurations of the concave edges of the blade sections of the other of the weed cutters.

* * * * *

UNITED STATES PATENT AND TRADEMARK OFFICE
CERTIFICATE OF CORRECTION

PATENT NO. : 5,146,734
DATED : September 15, 1992
INVENTOR(S) : Paul J. Smyczek

It is certified that error appears in the above-indentified patent and that said Letters Patent is hereby corrected as shown below:

Column 4, line 48:

Delete "suction" and substitute --- sections --- and Delete "correspond" and substitute --- corresponding ---.

Column 4, line 49:

Delete "consist" and substitute --- consists ---.

Column 4, line 61:

Delete "wed" and substitute --- weed ---.

Signed and Sealed this

Ninth Day of November, 1993

Attest:

BRUCE LEHMAN

Attesting Officer    Commissioner of Patents and Trademarks